(12) United States Patent
Camp et al.

(10) Patent No.: US 9,857,977 B2
(45) Date of Patent: *Jan. 2, 2018

(54) PHYSICAL ADDRESS MANAGEMENT IN SOLID STATE MEMORY

(71) Applicant: INTERNATIONAL BUSINESS MACHINES CORPORATION, Armonk, NY (US)

(72) Inventors: Charles J. Camp, Sugar Land, TX (US); Timothy J. Fisher, Cypress, TX (US); Kevin E. Sallese, Fulshear, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/193,263

(22) Filed: Jun. 27, 2016

(65) Prior Publication Data

US 2016/0306556 A1      Oct. 20, 2016

Related U.S. Application Data

(63) Continuation of application No. 14/073,614, filed on Nov. 6, 2013, now Pat. No. 9,400,745.

(51) Int. Cl.
*G06F 12/00* (2006.01)
*G06F 3/06* (2006.01)
(Continued)

(52) U.S. Cl.
CPC .......... *G06F 3/0604* (2013.01); *G06F 3/0614* (2013.01); *G06F 3/0659* (2013.01);
(Continued)

(58) Field of Classification Search
CPC ................ G06F 12/0246; G06F 3/061; G06F 2003/0691; G06F 2212/1016; G06F 2212/7205; G06F 2212/7208
(Continued)

(56) References Cited

U.S. PATENT DOCUMENTS 5,034,922 A    7/1991  Burgess
6,778,436 B2   8/2004  Piau et al.
(Continued)

OTHER PUBLICATIONS

Adeela Gill et al, "Programming and Erasing FLASH and EEPROM Memories on the MC68HC908AS60A/AZ60A".
(Continued)

*Primary Examiner* — Mardochee Chery
(74) *Attorney, Agent, or Firm* — Matthew C. Zehrer

(57) ABSTRACT

A storage system includes a memory controller connected to a solid state memory device and a read status table that tracks a pending read from the solid state memory device and a physical address of the solid state memory device that is associated with the pending read. The memory controller releases the physical address for reassignment when the read status table indicates that no pending reads are associated with the physical address. In certain embodiments, the read status table may be included within the memory controller. In certain embodiments, subsequent to the release of the physical address, erase operations may erase data at the physical address and the physical address may be reassigned to a new logical address by ensuing host write operations.

20 Claims, 6 Drawing Sheets

(51) Int. Cl.
*G06F 12/02* (2006.01)
*G06F 12/10* (2016.01)
*G06F 12/1027* (2016.01)

(52) U.S. Cl.
CPC .......... *G06F 3/0665* (2013.01); *G06F 3/0679* (2013.01); *G06F 12/0246* (2013.01); *G06F 12/10* (2013.01); *G06F 3/0638* (2013.01); *G06F 12/1027* (2013.01); *G06F 2212/152* (2013.01); *G06F 2212/214* (2013.01); *G06F 2212/651* (2013.01); *G06F 2212/657* (2013.01); *G06F 2212/7201* (2013.01); *G06F 2212/7205* (2013.01)

(58) Field of Classification Search
USPC ........................................................ 711/206
See application file for complete search history.

(56) References Cited

U.S. PATENT DOCUMENTS

| | | |
|---|---|---|
| 8,200,887 B2 | 6/2012 | Bennett |
| 9,229,854 B1 | 1/2016 | Kuzmin et al. |
| 9,274,942 B2 | 3/2016 | Hashimoto |
| 2005/0050283 A1* | 3/2005 | Miller ................... G06F 9/526 711/150 |
| 2007/0118688 A1 | 5/2007 | Lee et al. |
| 2007/0186065 A1* | 8/2007 | Lee ....................... G06F 3/0616 711/159 |
| 2008/0155185 A1 | 6/2008 | Kim |
| 2011/0055453 A1 | 3/2011 | Bennett |
| 2011/0276775 A1 | 11/2011 | Schuetz |
| 2012/0246388 A1 | 9/2012 | Hashimoto |
| 2013/0019057 A1 | 1/2013 | Stephens |
| 2013/0138912 A1* | 5/2013 | Bux ................... G06F 12/0646 711/170 |
| 2013/0185612 A1 | 7/2013 | Lee et al. |

OTHER PUBLICATIONS

Zsolt Kerekes, "SSD Myths and Legends—_write endurance_ article in StorageSearch".

"Simultaneous Read/Write versus Erase Suspend/Resume," Jul. 25, 2011.

List of IBM Patents or Patent Applications Treated As Related, Jun. 27, 2016.

Junghee Lee et al, "A Semi-Preemptive Garbage Collector for Solid State Drives," Performance Analysis of Systems and Software (ISPASS), 2011 IEEE International Symposium, Apr. 2011.

* cited by examiner

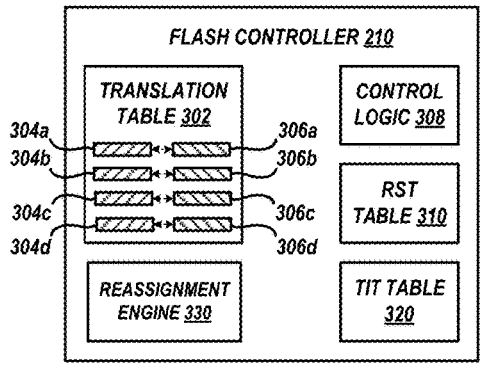
FIG. 3
READ STATUS TABLE 310
| ENTRY | VALID | WRITE PENDING | UNUSED | READ PENDING | UNUSED | PHYSICAL ADDR |
|---|---|---|---|---|---|---|
| 0 | | | | | | |
| 1 | | | | | | |
| - | | | | | | |
| - | | | | | | |
| - | | | | | | |
| 127 | | | | | | |
401  402  404  406  408  410  412
FIG. 4
TAG INDEX TABLE 320
| TAG ADDR | RST ADDR |
|---|---|
| 0 | |
| 1 | |
| - | |
| - | |
| - | |
| 255 | |
413  414
FIG. 5
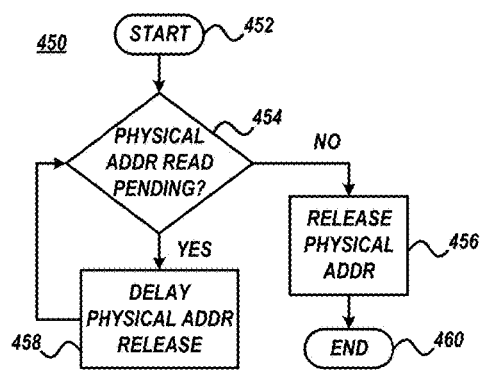
FIG. 6

PHYSICAL ADDRESS MANAGEMENT IN SOLID STATE MEMORY

FIELD

Embodiments of invention generally relate to storage systems and storage devices, and more particularly to managing old physical addresses used in solid state memory such as flash memory.

DESCRIPTION OF THE RELATED ART

Some storage solid state memory devices encompass rewritable non-volatile memory devices which use electronic circuitry for storing data. Solid state memory devices are currently replacing conventional storage devices such as hard disk drives and optical disk drives in mass storage applications such as hand held devices, laptop computers, desktop computers, and enterprise storage systems. Particular advantages of solid state memory devices are exceptional bandwidth as well as excellent random I/O (input/output) performance along with an appreciated robustness due to lack of moveable parts.

A particular type of solid state memory is NAND Flash memory, herein referred to as flash memory. Flash memory may be organized in units of pages and blocks, where pages form a block. While read and write operations can be applied to pages as a smallest unit, erase operations can only be applied to entire blocks. And while in other storage technologies outdated data can simply be overwritten by new data, flash memory requires an erase operation before new data can be written to an erased block.

Typically garbage collection and erase processes require support from a management structure for translating the physical addresses at which the data is stored in the flash memory into logical addresses used by upper layer systems interacting with the present storage system, and vice versa. Such translation may be accomplished with an LBA to PBA mapping table (Logical Block Address to Physical Block Address) or an LPN to PPN mapping table (Logical Page Number to Physical Page Number) subject to a block or page resolution of the mapping. A management structure including such address mapping and corresponding routines may advantageously be implemented in a controller of the flash memory device. The flash controller hides any address translation from the host such that the flash controller can be understood as a management structure that emulates the flash memory device as an LBA accessible storage device to the host.

In flash memory storage systems, when a host issues a new write, the associated data is typically written to a new physical address (PA) location (e.g. 8K page, etc.) in flash memory since a given page is written to once before an erase is required. Therefore, once the PA is written to, it is no longer valid for new writes.

A problem may occur when an old PA is released (e.g. enabling erase processes and/or garbage collection processes, etc.) prior to the completion of any in process reads or read dependencies. For example, a PA that is released may be the last address within a valid page of a given stripe and block. The release may also cause the entire block to become available for erase and reassignment. However, in progress reads that are dependent upon the data associated with the old PA will fail if erase operations have commenced.

SUMMARY

In an embodiment of the present invention, a method for managing old physical addresses in a solid state memory device includes tracking in a read status table a pending read from the solid state memory device and a physical address within the solid state memory device associated with the pending read, delaying a release of the physical address for reassignment when the read status table indicates that a pending read is associated with the physical address, and releasing the physical address for reassignment when the read status table indicates that no pending reads are associated with the physical address.

In another embodiment of the present invention, a method for managing old physical addresses in a solid state memory device includes tracking in a read status table a pending read from the solid state memory device and a physical address within the solid state memory device associated with the pending read and delaying a release of the physical address for reassignment when the read status table indicates that a pending read is associated with the physical address.

In yet another embodiment of the present invention, a method for managing old physical addresses in a solid state memory device includes tracking pending reads from physical addresses of a solid state memory device and delaying a release of a physical address for reassignment when a read is pending from the physical address.

In certain embodiments, subsequent to the release of the physical address, erase operations may erase data at the physical address and the physical address may be reassigned to a new logical address by ensuing host write operations.

These and other embodiments, features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 depicts an exemplary flash memory controller, according to various embodiments of the present invention.

FIG. 4 depicts an exemplary read status table, according to various embodiments of the present invention.

FIG. 5 depicts an exemplary tag index table, according to various embodiments of the present invention.

FIG. 6 depicts an exemplary block diagram of a method for managing old physical addresses in solid state memory, according to various embodiments of the present invention.

DETAILED DESCRIPTION

Figure 1:
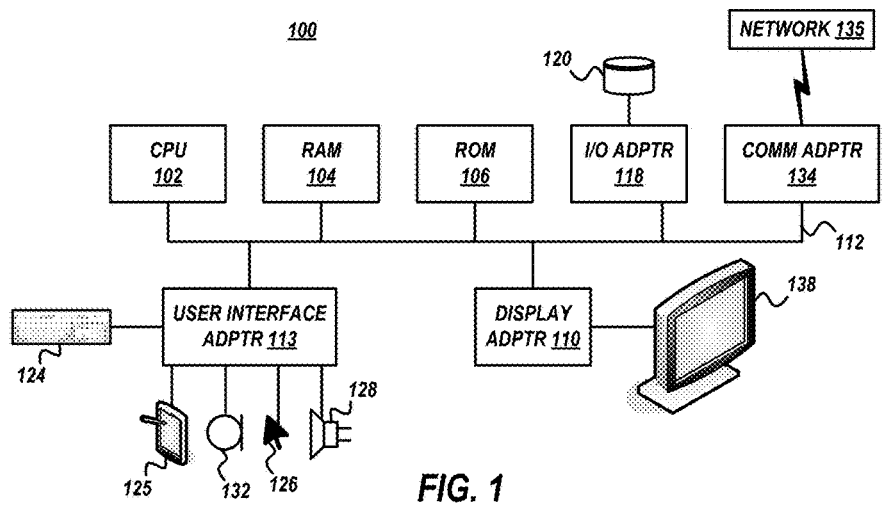
FIG. 1 depicts an exemplary data handling system, according to various embodiments of the present invention.

Details of the claimed embodiments are disclosed herein. However, it is understood that the disclosed embodiments are merely illustrative of the structures, devices, systems, methods, etc. that may be embodied in various forms. These exemplary embodiments are provided so that this disclosure will be thorough and complete and will convey the scope of this invention to those skilled in the art. In the description, details of well-known features and techniques may be omitted to avoid unnecessarily obscuring the presented embodiments.

Accordingly, aspects of the present invention may take the form of an entirely hardware embodiment, an entirely software embodiment (including firmware, resident software, microcode, etc.) or an embodiment combining software and hardware aspects that may all generally be referred to herein as a "device," "manager" or "system." Furthermore, aspects of the present invention may take the form of a computer program product embodied in one or more computer readable medium(s) having computer readable program code embodied thereon. Any combination of one or more computer readable medium(s) may be utilized.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The drawings are not necessarily to scale. The drawings are merely schematic representations, not intended to portray specific parameters of the invention. The drawings are intended to depict only exemplary embodiments of the invention. In the drawings, like numbering represents like elements.

FIG. 1 depicts an exemplary data handling system 100, according to various embodiments of the present invention. Data handling system 100 may include a central processing unit (CPU) 102, such as a microprocessor, and a number of other units interconnected via one or more buses 112 which may be of different types, such as a local bus, a parallel bus, a serial bus, etc., according to several embodiments.

Data handling system 100 may include a Random Access Memory (RAM) 104, Read Only Memory (ROM) 106, an I/O adapter 118 for connecting peripheral devices such as disk storage units 120 to the one or more buses 112, a user interface adapter 113 for connecting a keyboard 124, a mouse 126, a speaker 128, a microphone 128, and/or other user interface devices such as a touch screen 125, a digital camera (not shown), etc., to the one or more buses 112, a communication adapter 134 for connecting the data handling device 100 to a communication network 135 (e.g., a data processing network, storage network, etc.), and/or a display adapter 110 for connecting the one or more buses 112 to a display device 138. The data handling device 100 may have resident thereon an operating system such as the MICROSOFT WINDOWS Operating System (OS), a MAC OS, a UNIX OS, etc.

Figure 2:
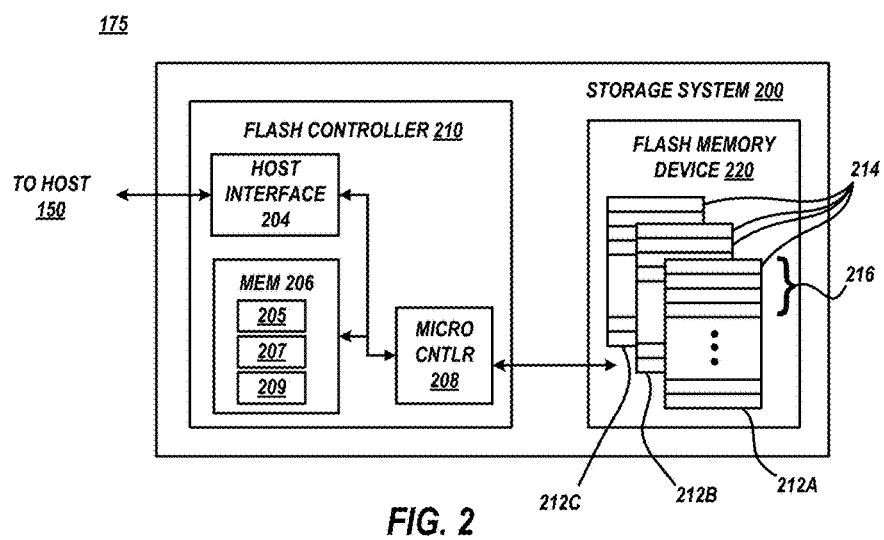
FIG. 2 depicts an exemplary storage system, according to various embodiments of the present invention.

FIG. 2 depicts an exemplary storage system 200, according to various embodiments of the present invention. The storage system 200 generally includes a solid state memory device 220 in signal communication with a solid state memory controller 210. A host 150 is connected to the storage system 200, and may be connected in particular to the controller 210. The host 150 specifically may be any entity reading data from the storage system 200 and/or writing data to the storage system 200.

In certain embodiments, storage system 200 may be integrated into a data handling device 100. For example, storage system 200 may be directly connected to the one or more buses 112 or connected via e.g. I/O adapter 118. Therefore, in certain embodiments e.g. CPU 102 may be host 150. In other embodiments, storage system 200 may be connected to data handling device 100 by a network (e.g. network 135, etc.). Therefore, in certain embodiments e.g. data handling device 100 may be host 150.

Storage system 200 provides a nonvolatile mass storage for use by host 150. Data to be stored in or to be read from the storage system 200 is addressed by host 150 with one of a plurality of logical address information, such as a logical address (LA). The storage system 200 transforms the logical address information into one of a plurality of physical address information by which the data stored in the flash memory system 200 can be accessed, such as a physical address (PA). As such, a mapping, e.g. in form of a table, between the LAs as used at the host 150 and the PAs as used in the storage system 200 may occur.

The controller 210 controls the functionalities (e.g., wear-leveling, logical to physical address translation using address mapping tables, maintaining mappings tables, garbage collection, etc.) of the flash memory device 220. The controller 210 may include a main memory 206 including a read cache 205, a write cache 207, and a main memory section 209 for other tasks, a micro controller 208, and/or other components not shown.

The controller 210 generally controls or manages operations performed by or within the flash memory device 220. The controller 210 manages data in the flash memory device 220 and controls internal management operations. In one embodiment, the controller 210 is separated from the flash memory device 200. In an alternate embodiment, the controller 210 is an integral part of the flash memory device 200 itself. In yet another embodiment, the controller 210 can be physically split into one or more sub-controllers each controlling a part of the flash memory device 220 and/or performing only certain flash management tasks. In another embodiment, the term "controller" as used herein refers to an application specific integrated circuit (ASIC) or field programmable gate arrays (FPGA), an electronic circuit, one or more processors (shared, dedicated, or group) and memory that performs one or more software or firmware programs/algorithms, a combinatorial logic circuit, and/or other suitable components that provide the described functionality. Controller 210 may include meta-data structures, such as, for example, address mapping tables, a bad block list, error correction codes, etc. These meta-data structures may be saved in the flash memory device 200 along with read/write data (e.g. stored in main memory section 209, etc.) and may be reconstructed within controller 210 when needed.

The flash memory device 220 may be a non-volatile, electrically re-writable memory device such as a NAND-flash-based memory device. However, other solid state memory devices such as PCM can be used. It is understood that the term "device" is not restricted to a single memory chip. In contrast, it is a preferred that the term device may include multiple memory chips building a memory device in combination.

Flash memory device 220 may include a number of pages 214 grouped together into blocks 216 (e.g. 64 pages per block). Blocks 216 of the flash memory device 220 may physically be on different flash memory chips 212 and the flash memory chips may be grouped into channels through which the flash memory chips are controlled by the controller 210. Therefore, the flash memory device 220 may be seen as a contiguous virtual memory space over all flash memory chips 212 present in the flash memory device 220. The number of blocks 216 and pages 214 per block 216 as well as the number of chips 212 and channels can vary depending on the application and should not be limited to the configurations shown herein.

In various embodiments, storage system 200 may provide either block accessed storage (e.g. Fibre Channel, iSCSI, SAS, FICON, etc.) or file accessed storage (NFS, CIFS, etc.). Storage system 200 and/or controller 210 may include a CPU (e.g. microcontroller 208, flash controller 210 in the form of an ASIC, etc.) connected to memory 206 by a bus. The CPU may execute program instructions stored in memory 206. For clarity, it should be understood that storage system 200 and/or controller 210 may have multiple CPUs. Memory 206 may be physically included within the CPU or connected to it via the system bus. Memory 206 may be for example a random access semiconductor memory for storing data and/or program instructions, code, logic, etc. Though memory 206 is shown conceptually as a single monolithic entity, memory 206 may be arranged as a hierarchy of caches and other memory devices. In some instances, a hierarchy of cache memories are associated with each CPU. Memory 206 may include operating software and/or flash control logic. Operating software may include an operating system that provides functions such as device drivers or interfaces, management of memory pages, management of multiple tasks, etc. The system bus may support the transfer of data, commands, and other information between controller 210 and flash memory device 220. The system bus may be structured as multiple buses which may be, for example, hierarchically arranged. The system bus may be connected to other components (such as host 150 via host interface 204, etc.) and/or to a myriad of external or peripheral devices through a connection hub, through an adapter, or directly to a network.

In certain embodiments, host interface 204 may be an adapter and may include adapter microcode or firmware and decision logic and may also be provided with at least one fast nonvolatile write cache, queues, interrupt registers, etc. Host interface 204 may process incoming or outgoing messages from or to data host 150. The adapter may contain electronic components and logic to adapt or convert data of one protocol on one bus to another protocol on another bus. In certain embodiments various adapters are included as host interface 204. Therefore, the host interface 204 may connect storage system 200 to numerous hosts 150 using one or more protocols including, but not limited to, Token Ring, Gigabyte Ethernet, Ethernet, Fibre Channel, SSA, storage area network (SAN), Fiber Channel Arbitrated Loop (FCAL), Serial SCSI, Ultra3 SCSI, Infiniband, FDDI, ATM, 1394, ESCON, wireless relays, Twinax, LAN connections, WAN connections, etc.

A write cache 207 and read cache 205 may be implemented memory 206 within controller 210. These caches may be organized as tables or hash maps or in another form of data structure. In an embodiment, the write cache 207 may be implemented in a non-volatile memory while the read cache may be implemented in a volatile memory. In this context, an exemplary volatile memory is SRAM or DRAM, and an exemplary non-volatile memory is Phase Change Memories (PCM) or MRAM. Therefore memory 206 may include multiple memory devices and memory types. In another embodiment, the entire memory 206 may be embodied according the needs of the write cache, such as a battery backed SDRAM, PCM, MRAM, etc.

The storage system 200 shown in FIG. 2 is intended to be a simplified representation, it being understood that many variations and implementations are possible in addition to those specifically mentioned herein.

FIG. 3 depicts an exemplary flash memory controller 210. In accordance with various embodiments of the present invention, a flash memory controller 210 may include a translation table 302, control logic 308, a read status table 310, a tag index table 320, and/or a reassignment engine 330.

Translation table 302 may be, for example, an LBA to PBA mapping table or an LPN to PPN mapping table subject to a block or page resolution, though in other embodiments translation table 302 may map a finer or courser resolutions. Generally translation table 302 maps a host side logical layer to a storage side physical layer. For example, translation table 302 maps logical address 304a, 304b, 304c, 304d, etc to respective physical addresses 306a, 306b, 306c, 306d, etc. Host 150 may transmit a write command to storage system 200 and may provide the data to be written and an associated logical address to storage system 200. In turn, storage system 200 may associate or map the logical address to a physical address in translation table 302 and may store the data at the physical address. Host 150 may further transmit a read command to storage system 200 that includes a logical address. Storage system 200 receives the read command and determines a physical address that is mapped to the logical address by querying the translation table 302. Once the physical address is determined, the storage system 200 provides the data at the physical address to host 150.

A read status table 310 is provided to track host read commands associated with one or more PAs. Generally, read status table 310 may be queried to determine if a particular PA, page associated with a PA, etc. may be released for reassignment. For example, if an entry in read status table 310 is found, it may indicate that there are existing, pending, etc. read associated with the PA, page associated with a PA, etc. Reassignment processes (e.g. erase, etc.) may be paused until the entry in read status table 310 indicates there are no pending, in processes, etc. reads associated with the PA, page associated with a PA, etc. In certain embodiments, read status table 310 may contain one entry per each PA, page associated with a PA, etc. In other embodiments, read status table 310 contains only entries associated with pending reads. In other words, an entry may be cleared from read status table 310 as soon as all pending reads associated with the entry have completed.

Tag index table 320 may be provided as an index to read status table 310. The tag index table 320 may store read status table 310 pointers entries may be quickly analyzed. As new entries are added to read status table 310, a read status table pointer is added to tag index table 320 at a location addressed by a tag received in the read command. The tag may be comprised within the read command throughout the entire read processes within controller 210. In certain embodiments, the tag within tag index table 320 may be used to index into read status table 310. In certain embodiments, the tag may be associated the read status table pointer within tag index table 320 and the read status pointer may be used to index into read status table 310.

Reassignment engine 330 reassigns old physical addresses to new logical addresses upon controller 210 indicating the physical address is released. For example, a particular physical address is associated to a logical address in translation table 302. After a certain time, that physical address becomes old. Controller 210 determines if there are any pending reads associated with the old physical address and if there is not releases the physical address. This release allows the old physical address to be reassigned by subsequent host 150 write operations. In certain embodiments, reassignment engine 330 may be an sub-circuit within controller 210, program instructions carried out by controller 210 CPU, etc.

FIG. 4 depicts an exemplary read status table 310, according to various embodiments of the present invention. Generally, read status table 310 includes a plurality of row entries that associate a physical address with pending read activity. Each row entry, therefore, includes at least a physical address entry and a read pending entry. Respective physical address field entry may include the physical address for which pending read activity is associated and may be stored in physical address column 412. Read pending field entries may include an indication whether there is pending read activity and may be stored in read pending column 408. In certain embodiments, read pending entry is a read pending counter that may be incremented whenever a read associated with the physical address is requested by host 150.

In certain embodiments, read status table 310 row entries may also include an entry identifier within entry identifier column 401. Each entry identifier generally identifies a particular read status table 310 row entry. Each entry identifier, therefore, will typically be unique relative to other entry identifiers. In certain embodiments, read status table 310 includes 127 row entries and therefore includes 127 unique entry identifiers.

In certain embodiments, read status table 310 row entries may also include a valid field within valid column 404. A valid field entry generally indicates whether there is current pending read activity and may be set as active whenever there is current pending read activity associated with a physical address. The valid field entry may also be set as inactive whenever there is no pending read activity associated with a physical address.

In certain embodiments, read status table 310 row entries may also include a write pending field within write pending column 404. A write pending field entry generally indicates that an associated physical address is an old physical address and may be reassigned.

When a particular fields share a row, that may be identified by an row entry identifier, the fields are associated and interrelated. For example, a physical address within physical address field is associated with a read pending indication within read pending field if they share a row.

In certain embodiments, read status table may include unused e.g. entries, unused bit lanes, etc. that may be beneficial for table alignment, debug etc. For example columns 406 and 410 may be unused.

In a particular embodiment, the entry stored within physical address field is a 30 bit entry, unused column 410 entry is a 2 bit entry, the entry stored within read pending field is a 7 bit entry, unused column 406 entry is a 1 bit entry, the entry stored within write pending field is a 1 bit entry, and the entry stored within valid field is a 1 bit entry.

FIG. 5 depicts an exemplary tag index table 320, according to various embodiments of the present invention. A tag index table 320 may include read status table 310 pointer entries included within RST ADDR column 414. As new row entries are added to read status table 310, a RST ADDR column 414 is added to tag index table 320 at a location addressed by a tag address within TAG ADDR column 413. A particular tag address may included within a read command throughout the entire read processes within controller 210. In certain embodiments, the tag address within TAG ADDR column 413 may be used to index into read status table 310. In certain embodiments, the tag may be associated the read status table pointer within RST ADDR column 413 by sharing a row and the read status pointer may be used to index into read status table 310. In certain embodiments, there may be 255 TAG ADDR entries within tag index table 320. In certain embodiments, RST ADDR entries may be 10 bit pointers to read status table 310.

FIG. 6 depicts an exemplary block diagram of a method 450 for managing old physical addresses in solid state memory, according to various embodiments of the present invention. Method 450 begins at block 452 and continues with a flash memory controller 210 determining whether there is pending read activity associated with a physical address (block 454). If the controller 210 determines there is no pending read activity associated with a physical address, the physical address is released (block 456). For example, the controller 210 releases the physical address for erase procedures, garbage collection, etc. so that the physical address may be reassigned by reassignment engine 300 during subsequent host 150 write operations. If the controller 210 determines there is pending read activity associated with the physical address, release of the physical address is delayed (block 458) until there is no pending read activity. Method 450 ends at block 460.

Figure 7:
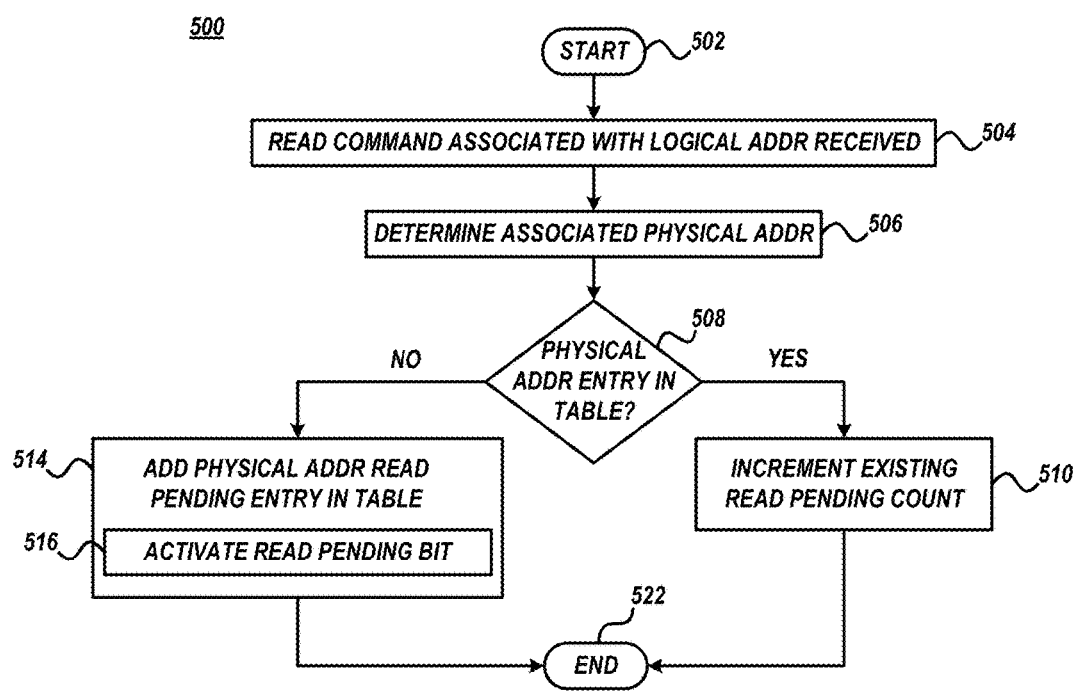
FIG. 7 depicts an exemplary block diagram of a method for managing pending reads, according to various embodiments of the present invention.

FIG. 7 depicts an exemplary block diagram of a method 500 for managing pending reads, according to various embodiments of the present invention. Method 500 begins at block 502 and continues with flash controller 210 receiving a read command that includes at least a logical address from host 150 (block 504). Controller 210 determines a physical address that is associated with the logical address (block 506). For example, controller 210 may determine the physical address that is associated with the logical address by querying translation table 302.

Method 500 continues by controller 210 determining whether the physical address is associated with a read pending entry within a pending read table (block 508). If the pending read table does not include a pending read entry associated with the physical address, controller 210 adds a read pending entry into the pending read table (block 514). For example, controller 210 may add the physical address into a pending read table, controller may set a pending read entry that is associated with the physical address as active (block 516), etc. If the pending read table does include a pending read entry associated with the physical address, controller 210 increments a read pending count associated with the physical address within the pending read table (block 510). Method 500 ends at block 522.

Figure 8:
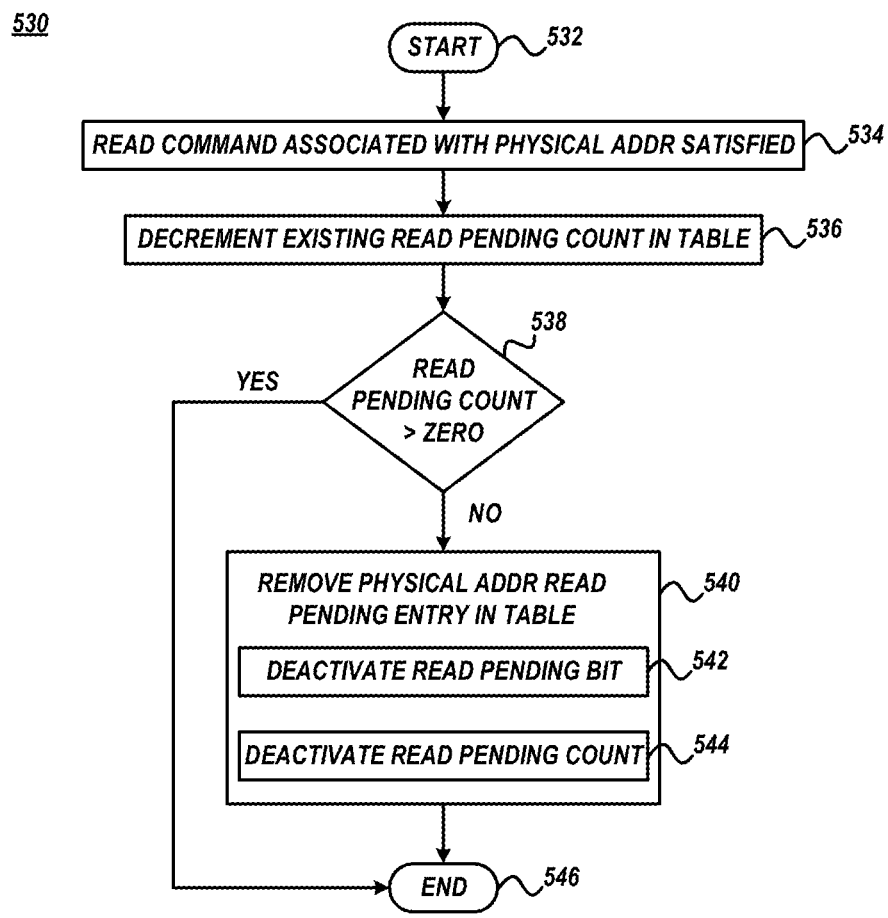
FIG. 8 depicts an exemplary block diagram of a method for managing satisfied reads, according to various embodiments of the present invention.

FIG. 8 depicts an exemplary block diagram of a method 530 for managing satisfied reads, according to various embodiments of the present invention. Method 530 begins at block 532 and continues with a read command from host 150 being satisfied or otherwise completed (block 534). In other words, the data requested by host 150 is returned to host 150. Controller 210 decrement or decreases a read pending count within a pending read table that is associated with the physical address from which data was returned to host 150 (block 536). If there are more pending reads, method 530 ends at block 546. However, if all pending reads associated with the physical address have been satisfied, controller 210 removes associated pending read entry or entries from the pending read table (block 540). For example, controller 210 may deactivate a read pending bit associated with the physical address (block 542), controller 210 may deactivate a read pending count associated with the physical address (block 544). Method ends at block 546.

Figure 9:
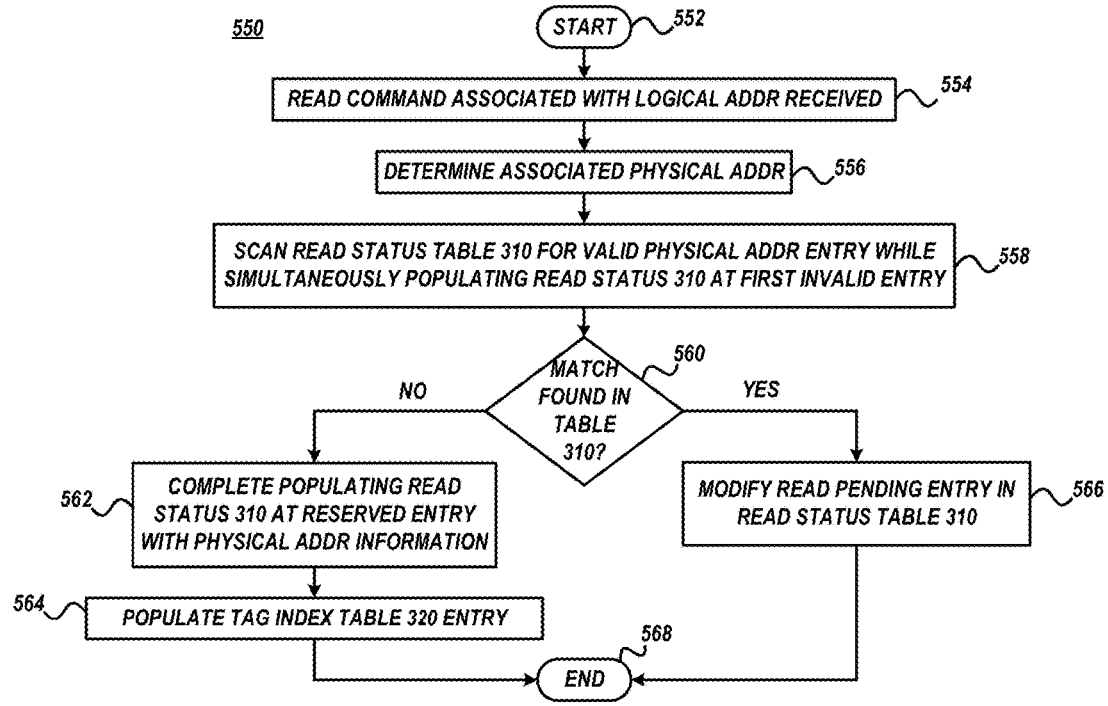
FIG. 9 depicts an exemplary block diagram of a method for managing pending reads, according to various embodiments of the present invention.

FIG. 9 depicts an exemplary block diagram of a method 550 for managing pending reads utilizing read status table 310 and tag index table 320, according to various embodiments of the present invention. Method 550 begins at block 502 and continues with flash controller 210 receiving a read command that includes at least a logical address from host 150 (block 554). Controller 210 determines a physical address that is associated with the logical address (block 556). For example, controller 210 may determine the physical address that is associated with the logical address by querying translation table 302.

Method 550 continues with controller 210 scanning read status table 310 for a valid row entry while simultaneously beginning to populate read status table 310 at a first invalid row entry (block 558). For example, controller 210 scans read status table 310 for a valid row entry that is associated with the physical address. At the same time, controller determines the first invalid row entry by querying valid field column 402 to determine an invalid entry and begins to populate that invalid row entry with, e.g. a physical address entry within physical address column 412, a pending read entry within read pending column 408, etc.

Method 550 continues with controller 210 determining if a valid row entry associated with the physical address exists in read status table 310 (block 560). If a valid row entry associated with the physical address is found in read status table 310, controller 210 modifies the read pending entry within read pending column 408. For example, controller 210 increments a read pending count entry within read pending column 408 (block 566). In certain embodiments, controller 210 may clear any entries or partial entries that it may have populated associated with block 558. If a valid row entry associated with the physical address is not found in read status table 310, controller 210 completes populating the invalid row entry in read status table 310 with, e.g. a physical address entry within physical address column 412, a pending read entry within read pending column 408, etc. (block 562). In certain embodiments, after populating the invalid row entry, controller 210 also flips the invalid entry within column 402 to a valid entry to indicate there are pending reads associated with the physical address in the row entry.

Method 550 continues with controller 210 populating tag index table 320 (block 564). For example, controller 210 adds a read pointer entry included within RST ADDR column 414 at a location addressed by a tag address entry within TAG ADDR column 413 that is associated with the physical address. The read pointer entry points to the associated row entry within read status table 310. Method 550 ends at block 568.

Figure 10:
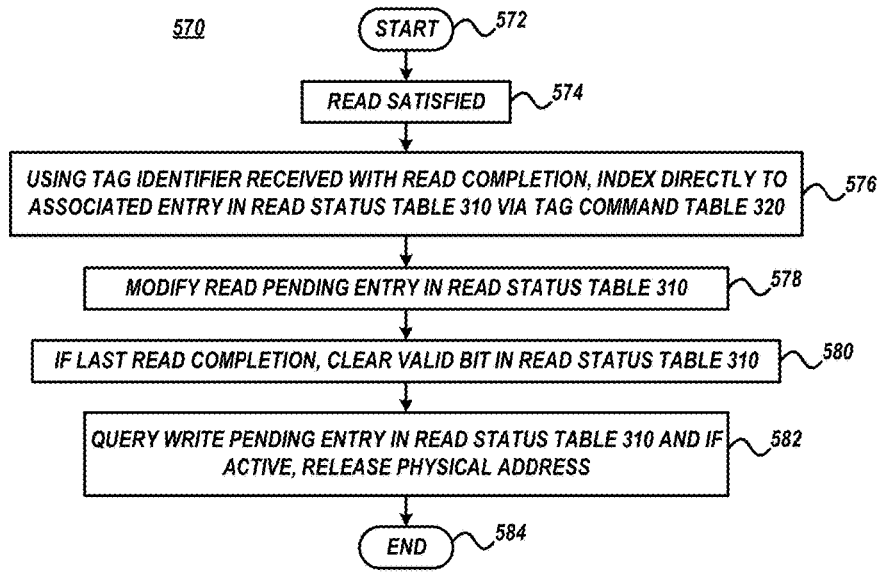
FIG. 10 depicts an exemplary block diagram of a method for managing satisfied reads, according to various embodiments of the present invention.

FIG. 10 depicts an exemplary block diagram of a method 570 for managing satisfied reads utilizing read status table 310 and tag index table 320, according to various embodiments of the present invention. Method 570 begins at block 572 and continues with a read command from host 150 being satisfied or otherwise completed (block 574). In other words, the data requested by host 150 is returned to host 150. Using the tag address associated with the read completion, controller 210 queries tag index table 320 to index directly to the associated row entry within read status table 310.

Method 570 continues with controller 210 modifying a read pending entry within read pending column 408 in read status table 310 (block 578). For example, controller 210 decrements the read pending entry in read pending column 408. If the completed read is the last read, the controller 210 clears the valid entry in column 402 (block 580). For example, controller 210 flips a valid entry or bit in column 402 to an invalid entry or bit, etc. Method 570 continues with controller 210 querying the write pending field within read status table 310 and if the write pending entry in the write pending field is active, controller 210 releases the associated physical address (block 582). Once released, erase procedures, garbage collection, etc. may commence and the physical address may be reassigned by reassignment engine 330 in subsequent host 150 write operations. Method 570 ends at block 584.

Figure 11:
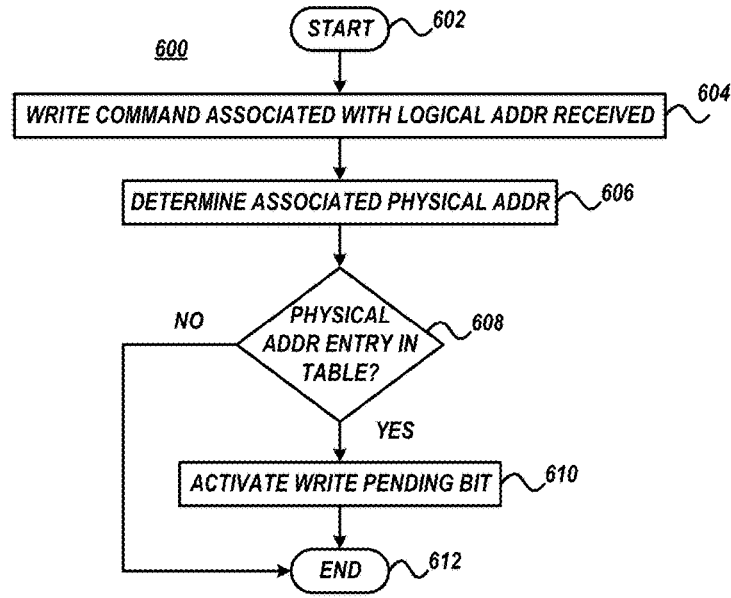
FIG. 11 and FIG. 12 depict exemplary block diagrams of methods for managing pending writes, according to various embodiments of the present invention.

FIG. 11 depicts an exemplary block diagram of a method 600 for managing pending writes, according to various embodiments of the present invention. Method 600 begins at block 602 and continues with controller 210 receiving a host write command (block 604). For example, host 150 transmits a command to storage device 200 to store data, where the command includes a particular logical address. Controller 202 determines an associated physical address (block 606). For example, controller determines or assigns a physical address that is or shall be associated with the logical address within translation table 302. If the physical address is present in a pending read table (block 608), controller 202 activates a write pending entry within the pending read table (block 610). Method 600 ends at block 612

Figure 12:
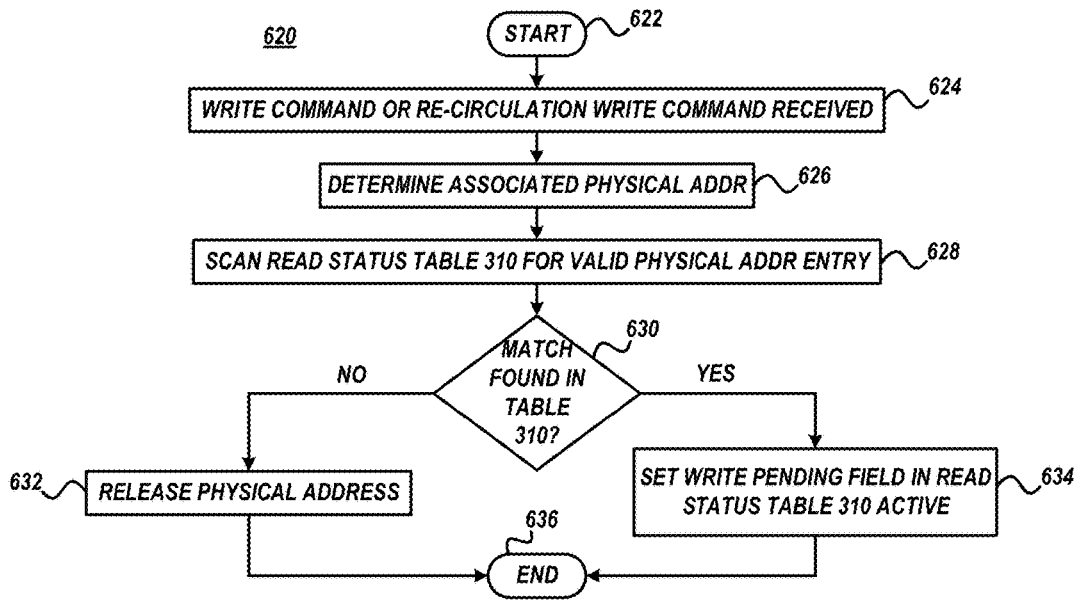

FIG. 12 depicts an exemplary block diagram of a method 620 for managing pending writes utilizing read status table 310, according to various embodiments of the present invention. Method 620 begins at block 622 and continues with controller 210 receiving a host 150 write command or a re-circulation write command (block 624). For example, controller 210 receives or initiates a re-circulation write command to reassign the association between a particular logical address 304 and a particular physical address 306 within translation table 302. Controller 202 determines an physical address associated with the write or re-circulation write logical address (block 626).

Method 620 continues with controller 210 scanning read status table 310 for a valid row entry associated with the physical address (block 628). If a match is found within read status table 310, controller 210 modifies a write pending entry in column 404 (block 634). For example, controller 210 activates a write pending bit within the write pending field. If no match is found within read status table 310, controller 210 releases the physical address (block 632). Once released, erase procedures, garbage collection, etc. may commence and the physical address may be reassigned by reassignment engine 330 in subsequent host 150 write operations. Method 620 ends at block 636.

In certain embodiments, methods 450, 500, 530, 550, 570, 600, and or 620 may take the form of computer program instructions or control logic 310. These computer program instructions may be provided to a controller 210 processor, such as micro controller 208 to produce a machine, such that the instructions, which execute via the processor, execute or implement the functions or acts specified in method 450, 500, 530, 550, 570, 600, and or 620 block diagram block(s).

In certain embodiments, host read cache operations may be ignored by controller 210 implementing one or more of the pending read operations described herein until controller 210 receives an associated write command. In certain embodiments, XOR writes need not be tracked within a pending read table since host 150 typically has no knowledge thereof. In certain embodiments, error handling operations should not process read completions that have errors. If a particular read fails, it may be retried in a retry engine several times and re-constructed if retries fails and eventually flushed to destination. In certain embodiments, read cache 205 may be utilized to absorb bursts in read activity while pending read operations are in progress.

The accompanying figures and this description depicted and described embodiments of the present invention, and features and components thereof. Those skilled in the art will appreciate that any particular nomenclature used in this description was merely for convenience, and thus the invention should not be limited by the specific process identified and/or implied by such nomenclature. Therefore, it is desired that the embodiments described herein be considered in all respects as illustrative, not restrictive, and that reference be made to the appended claims for determining the scope of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method for managing old physical addresses in a solid state memory device comprising:
   tracking in a read status table pending reads from the solid state memory device and tracking in the read status table physical addresses within the solid state memory device associated with the pending reads;
   assigning a first logical address to a particular physical address within the solid state memory device;
   delaying a release of the particular physical address for reassignment to a second logical address when the read status table indicates that there is a pending read from the particular physical address; and releasing the particular physical address for reassignment to the second logical address when the read status table indicates that there is no pending reads from the particular physical address.

2. The method of claim 1, further comprising:
reassigning the second logical address to the particular physical address subsequent to the particular physical address being released.

3. The method of claim 1, wherein tracking in the read status table pending reads from the solid state memory device and tracking in the read status table physical addresses within the solid state memory device associated with the pending reads, comprises:
receiving a read command comprising the first logical address;
determining the particular physical address from the first logical address, and;
querying the read status table for an entry associated with the particular physical address.

4. The method of claim 1, wherein tracking in the read status table pending reads from the solid state memory device and tracking in the read status table physical addresses within the solid state memory device associated with the pending reads, comprises:
populating a read pending entry in the read status table associated with the particular physical address.

5. The method of claim 4, wherein populating the read pending entry in the read status table, comprises:
incrementing a read pending count.

6. The method of claim 5, wherein tracking in the read status table pending reads from the solid state memory device and tracking in the read status table physical addresses within the solid state memory device associated with the pending reads, comprises:
decrementing the read pending count upon the completion of the read from the particular physical address.

7. A method for managing old physical addresses in a solid state memory device comprising:
tracking in a read status table pending reads from the solid state memory device and tracking in the read status table physical addresses within the solid state memory device associated with the pending reads;
assigning a first logical address to a particular physical address within the solid state memory device; and
delaying a release of the particular physical address for reassignment to a second logical address when the read status table indicates that there is a pending read from the particular physical address.

8. The method of claim 7, further comprising:
reassigning the second logical address to the particular physical address subsequent to the particular physical address being released.

9. The method of claim 7, wherein tracking in the read status table pending reads from the solid state memory device and tracking in the read status table physical addresses within the solid state memory device associated with the pending reads, comprises:
receiving a read command comprising the first logical address;
determining the particular physical address from the first logical address, and;
querying the read status table for an entry associated with the particular physical address.

10. The method of claim 7, wherein tracking in the read status table pending reads from the solid state memory device and tracking in the read status table physical addresses within the solid state memory device associated with the pending reads, comprises:
populating a read pending entry in the read status table associated with the particular physical address.

11. The method of claim 10, wherein populating the read pending entry in the read status table, comprises:
incrementing a read pending count.

12. The method of claim 11, wherein tracking in the read status table pending reads from the solid state memory device and tracking in the read status tablephysical addresses within the solid state memory device associated with the pending reads, comprises:
decrementing the read pending count upon the completion of the read from the particular physical address.

13. A method for managing old physical addresses in a solid state memory device comprising:
tracking pending reads from physical addresses of a solid state memory device;
assigning a first logical address to a particular physical address within the solid state memory device; and
delaying a release of a particular physical address for reassignment to a second logical address when a read is pending from the particular physical address.

14. The method of claim 13, further comprising:
assigning the second logical address to the particular physical address subsequent to the particular physical address being released.

15. The method of claim 13, wherein tracking pending reads from physical addresses of the solid state memory device, comprises:
a read command comprising the first logical address;
determining the particular physical address from the first logical address, and;
querying a read status table for an entry associated with the particular physical address.

16. The method of claim 13, wherein tracking pending reads from physical addresses of the solid state memory device, comprises:
populating a read pending entry in a read status table associated with the particular physical address.

17. The method of claim 16, wherein populating the read pending entry in the read status table, comprises:
incrementing a read pending count.

18. The method of claim 17, wherein tracking pending reads from physical addresses of the solid state memory device, further comprises:
decrementing the read pending count upon the completion of the read from the particular physical address.

19. The method of claim 13, further comprising:
tracking pending writes to physical addresses of the solid state memory device.

20. The method of claim 19, wherein tracking pending writes to physical addresses of the solid state memory device, comprises:
populating a write pending entry in a write status table associated with the particular physical address.

* * * * *